No. 640,957. Patented Jan. 9, 1900.
A. SATTLER.
APPARATUS FOR TREATING AND PRESERVING GROWING PLANTS.
(Application filed Mar. 27, 1899.)
(No Model.)
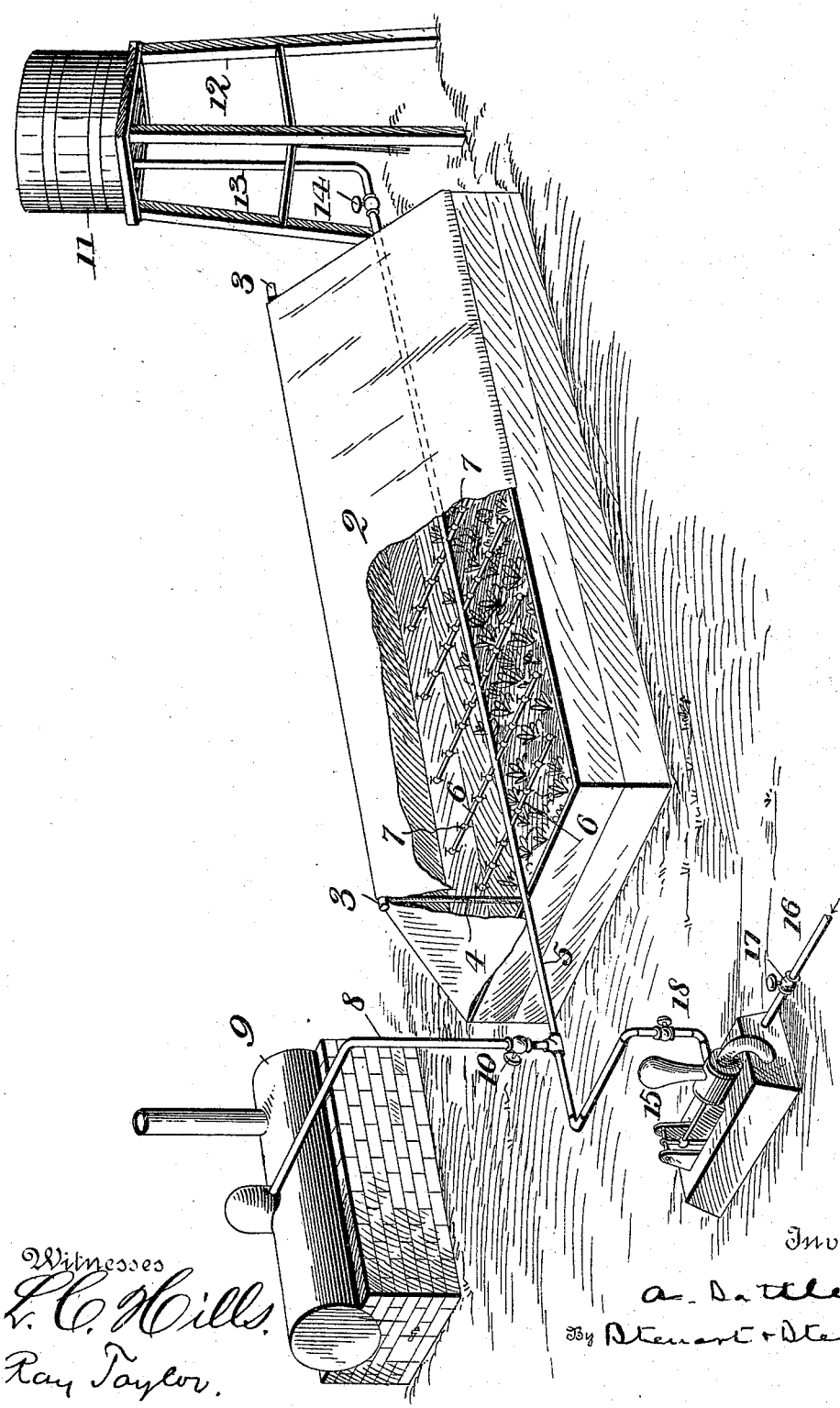

UNITED STATES PATENT OFFICE.

AUGUSTUS SATTLER, OF MICANOPY, FLORIDA.

APPARATUS FOR TREATING AND PRESERVING GROWING PLANTS.

SPECIFICATION forming part of Letters Patent No. 640,957, dated January 9, 1900.

Application filed March 27, 1899. Serial No. 710,669. (No model.)

*To all whom it may concern:*

Be it known that I, AUGUSTUS SATTLER, a citizen of the United States of America, and a resident of the city of Micanopy, State of Florida, have invented certain new and useful Improvements in Apparatus for the Treatment and Preservation of Growing Plants, of which the following is a specification.

This invention relates to the treatment and preservation of growing plants, and has especial reference to the propagation of fruit-bearing plants in southern or warm climates, where there is a liability of sudden and severe changes in temperature and risk thereby of the crop being lost.

The invention has for its object to provide an apparatus whereby a bed of growing plants may be quickly and readily covered and protected in case of sudden fall of temperature, and also whereby the temperature may be regulated and the plants and ground artificially irrigated, the apparatus for giving the artificial heat being so constructed and arranged as to be readily and quickly converted into use for irrigation or heating, as the occasion may demand.

The invention consists of an apparatus by means of which the bed of plants may be quickly and readily covered or uncovered and by means of which also the apparatus may be readily and quickly convertible into an irrigating or a heating device, as the occasion demands.

The accompanying drawing illustrates in perspective an apparatus constructed in accordance with this invention.

In carrying out this invention a suitable portable inclosure or covering is provided, which preferably consists of a light knock-down frame composed of planks when set on edge, forming the ends and sides of the inclosure surrounding the bed of plants. Forming a covering for this inclosure is a canvas 2, which is drawn over the ridge-pole 3, mounted on uprights 4, secured to and projecting from the ends of the inclosure. This canvas 2 is detachable and may be secured in any suitable manner to the sides and ends of the inclosure. The boards composing the sides and ends of the inclosure may be detachably secured together in any suitable manner, so as to be readily taken down.

For the purpose of regulating the temperature in the inclosure just described and also to alternately therewith irrigate the bed of plants I provide an apparatus as follows: 5 is a main pipe which extends lengthwise over the bed of plants, preferably the top of the sides and ends of the inclosure, as shown, and is provided with branch pipes 6, extending laterally from said pipe 5 crosswise of the bed of plants. The pipes 6 are provided with a number of cocks 7, depending above the bed of plants. To provide heat for regulating the temperature of the bed of plants in the inclosure, the pipe 5 is connected by means of a branch pipe 8 with the boiler 9, from which hot water or steam may be conveyed to the branch pipes 6, the connection of the boiler 9 with the main pipe being controlled by a stop-cock 10. Connected with the main pipe 5 is a water-tank 11, elevated on a suitable support 12, connected by means of a branch pipe 13 with the pipe 5, the supply of water from the reservoir 11 being controlled by means of a stop-cock 14. Also connected with the main pipe 5 is a pump 15, which is connected by a pipe 16 with any suitable water-supply controlled by means of a stop-cock 17. The connection of the pump 15 with the main pipe 5 is controlled by means of a stop-cock 18. The method of using the apparatus is as follows: When it is desired to regulate the temperature, the bed of plants is covered with an inclosure, as described, and the pump 15 is cut off by means of the cock 18 from the cock 5 and the reservoir 11 by means of the cock 14 from the pipe 5. The steam or hot water from boiler 9 is then conveyed to the pipe 5 by opening the cock 10. A suitable return (not shown) is so arranged in connection with the boiler 9 as to force proper circulation of the hot water or steam in the pipes. When it is desired to irrigate the bed of plants, the supply from the boiler 9 to the pipe 5 is cut off by closing the cock 10. Then water may be conveyed to the pipe 5 from the reservoir 11 by opening the cock 14, and by opening the cock 7 of the branch pipe 6 the bed of plants may be irrigated, or the reservoir 11 may be cut off from the pipe 5 by closing the cock 14 and the cocks 17 and 18 opened and water pumped into the pipe 5 and the bed of plants irrigated, as before.

When it is desired to expose the bed of plants, the knockdown inclosure may readily and quickly be taken apart.

By means of the foregoing-described apparatus the bed of plants may be readily protected with the knockdown inclosure, and by means of one apparatus the temperature may be regulated or the bed of plants irrigated, as desired.

I claim as follows:

An apparatus for the treatment and propagation of plants consisting of a knockdown inclosure covering a bed of plants, a main pipe extending lengthwise of the inclosure above said bed of plants, and branch pipes connected with and extending transversely through said main pipe from side to side of the inclosure, and having a series of depending water-cocks, a boiler connected with said main pipe, a valve for controlling connection of said boiler with the main pipe, a pump connected with said pipe and a valve for controlling the connection of said pump with the main pipe, and a source of water-supply connected with said pump and with said main pipe, a valve for controlling the connection of said water-supply and pump with the main pipe, whereby the system and arrangement of pipes, pump, boiler, and water-supply, may be utilized to either regulate the temperature or to irrigate the bed of plants, as set forth.

Signed by me at Micanopy, State of Florida, this 21st day of March, 1899.

AUGUSTUS SATTLER.

Witnesses:
S. H. BENJAMIN,
J. HEYMAN.